T. GRUNDMANN.
Cane Crusher.

No. 27,900. Patented April 17, 1860.

Witnesses:
R. S. Spencer
J. W. Coombs

Inventor:
Theodore Grundmann
Munn & Co.
Attorneys.

UNITED STATES PATENT OFFICE.

THEODORE GRUNDMANN, OF FREEPORT, ILLINOIS.

IMPROVEMENT IN MACHINES FOR CRUSHING SUGAR-CANE.

Specification forming part of Letters Patent No. 27,900, dated April 17, 1860.

*To all whom it may concern:*

Be it known that I, THEODORE GRUNDMANN, of Freeport, in the county of Stephenson and State of Illinois, have invented a new and Improved Cane-Crushing Machine; and I do hereby declare that the following is a full, clear, and exact description of the same, reference being had to the annexed drawings, making a part of this specification, in which—

Figure 1:
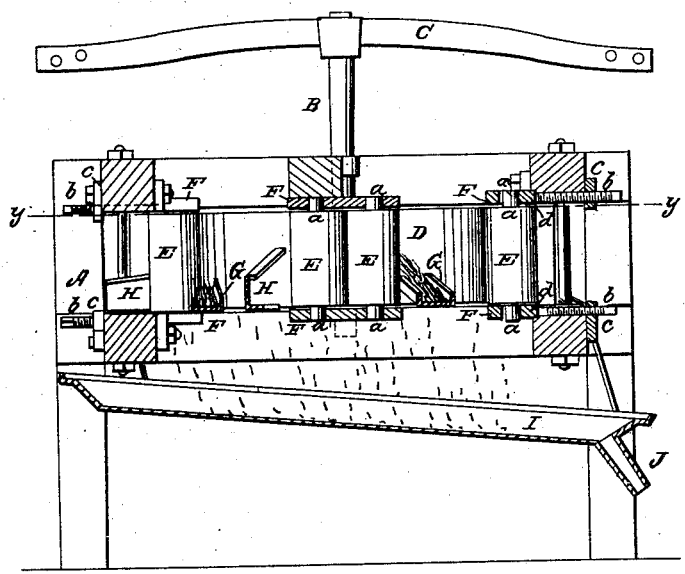
Figure 2:
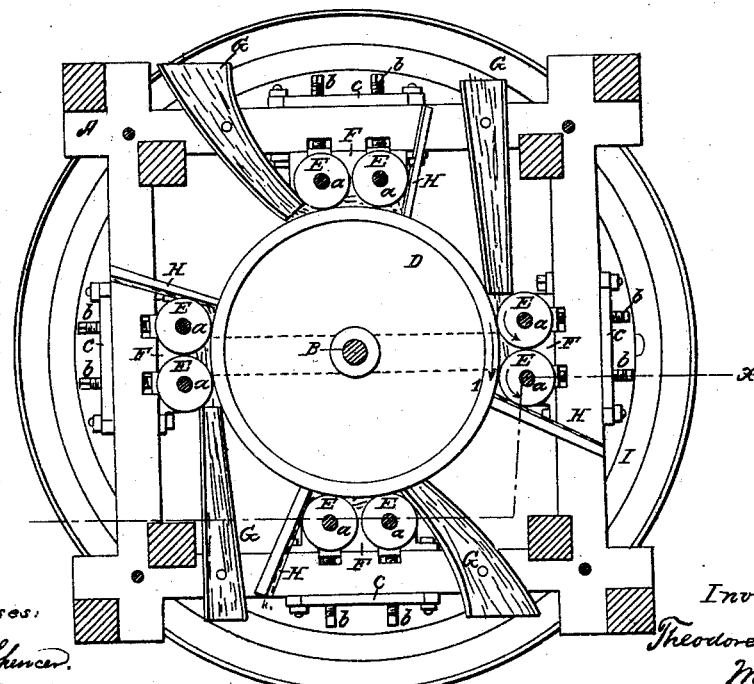

Figure 1 is a side sectional view of my invention, taken in the line $x\ x$, Fig. 2. Fig. 2 is a longitudinal section of the same, taken in the line $y\ y$, Fig. 1.

Similar letters of reference indicate corresponding parts in the two figures.

The object of this invention is to obtain a simple, compact, and efficient cane-crushing machine, one that can be attended with but few hands and have a great working capacity.

The invention consists in the employment or use of a large central cylinder or drum in connection with a series of pressure-cylinders arranged to operate substantially as hereinafter shown and described, whereby the desired end is attained.

To enable those skilled in the art to fully understand and construct my invention, I will proceed to describe it.

A represents a rectangular frame, in which a central vertical shaft, B, is placed, provided with a sweep, C, at its upper end. On this shaft B a drum or cylinder, D, is placed. This drum has a smooth periphery, and it may be constructed wholly of metal or be faced with metal.

Against the periphery of the drum or cylinder D a series of pressure-rollers, E, bear. These pressure-rollers are placed side by side in pairs, as shown clearly in Fig. 2, and the pairs of rollers are placed at equal distances apart. Four pairs of pressure-rollers are shown in the drawings; but more may be used, if desired. The number, of course, should correspond with the size of the machine or with the diameter of the central drum or cylinder, D. The axes $a$ of the pressure-rollers E are fitted in plates F, attached to the frame A, and the rollers are rendered adjustable by screws $b$, which pass through plates $c$, and are in contact with the bearing $d$ of the axes of the rollers in the plates F. Both rollers E of each pair bear against the periphery of the drum D, and with a greater or less pressure, as may be required, by adjusting the screws $b$. Each pair of pressure-rollers is provided with a feed-trough G, and a discharge-spout or deflector, H, as shown clearly in Fig. 3.

Within the frame A and below the drum or cylinder D there is placed an inclined circular receiver, I, which is provided at its depressed end or part with a discharge-spout, J.

The operation is as follows: The shaft B may be rotated by any convenient power. Animal-power, however, would be most generally used, the sweep C extending a suitable length at two opposite sides of the machine to admit of the animals walking around the machine without interfering with the attendants. Two attendants are required to operate the machine, the attendants being at two opposite sides thereof, so as to command each two feed-troughs G. The drum or cylinder D is rotated in the direction indicated by arrow 1, and the cane is feed into the troughs G by the attendants, the cane being crushed in its passage between the cylinder and rollers. The juice as it is expressed from the cane falls into the receiver I, from which it is discharged through the spout J. The crushed cane is discharged from the machine by means of the spouts or deflectors H.

It will be seen that the pressure-rollers E are all rotated by the rotation of the central drum or cylinder, D, and the cane may be subjected to the required pressure by adjusting the screws $b$.

The machine, it will be seen, is rendered very compact. It may be very economically constructed, attended by persons of ordinary ability, and there are no parts liable to get out of repair or become deranged by use.

Having thus described my invention, what I claim as new, and desire to secure by Letters Patent, is—

The arrangement and combination, for the purpose specified, of the drum or cylinder D, pressure-rollers E, provided with the feed and discharge spouts G H, and the receiver I, substantially as set forth.

THEODORE GRUNDMANN.

Witnesses:
 FREDRICK FEHLY,
 JOHN H. MILLER.